(12) United States Patent
Edgren

(10) Patent No.: US 10,131,186 B2
(45) Date of Patent: Nov. 20, 2018

(54) DRIVER COMMUNICATION INTERFACE IN AN AT LEAST PARTLY AUTONOMOUS DRIVE SYSTEM

(71) Applicant: VOLVO CAR CORPORATION, Gothenburg (SE)

(72) Inventor: Claes Edgren, Trollhattan (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 14/694,251

(22) Filed: Apr. 23, 2015

(65) Prior Publication Data

US 2015/0314729 A1 Nov. 5, 2015

(30) Foreign Application Priority Data

Apr. 30, 2014 (EP) .................................... 14166603

(51) Int. Cl.

| | |
|---|---|
| *B60K 35/00* | (2006.01) |
| *B60W 30/12* | (2006.01) |
| *B60C 9/00* | (2006.01) |
| *B60W 30/00* | (2006.01) |
| *B60Q 9/00* | (2006.01) |
| *G08B 6/00* | (2006.01) |
| *B60W 50/16* | (2012.01) |
| *G06F 3/01* | (2006.01) |
| *G06F 3/0338* | (2013.01) |
| *G05D 1/00* | (2006.01) |

(52) U.S. Cl.
CPC .................. *B60C 9/00* (2013.01); *B60Q 9/00* (2013.01); *B60W 30/00* (2013.01); *B60W 50/16* (2013.01); *G05D 1/0061* (2013.01); *G06F 3/016* (2013.01); *G06F 3/0338* (2013.01); *G08B 6/00* (2013.01); *G05D 2201/0213* (2013.01)

(58) Field of Classification Search
CPC combination set(s) only.
See application file for complete search history.

(56) References Cited

U.S. PATENT DOCUMENTS

| | | | |
|---|---|---|---|
| 5,548,516 | A | 8/1996 | Gudat et al. |
| 5,765,116 | A | 6/1998 | Wilson-Jones et al. |
| 6,559,764 | B1 | 5/2003 | Neuner et al. |
| 7,970,514 | B2 | 6/2011 | Aeberhard et al. |

(Continued)

FOREIGN PATENT DOCUMENTS

| | | |
|---|---|---|
| CN | 102745224 A | 10/2012 |
| CN | 103460164 A | 12/2013 |

(Continued)

OTHER PUBLICATIONS

Extended European Search Report dated Aug. 1, 2014, Application No. 14166603.2-1802, Applicant Volvo Car Corporation, 7 Pages.

(Continued)

*Primary Examiner* — Brian Zimmerman
*Assistant Examiner* — Cal Eustaquio
(74) *Attorney, Agent, or Firm* — Brooks Kushman P.C.

(57) ABSTRACT

A communication interface between a driver of a vehicle and an at least partly autonomous drive system in the vehicle. The communication interface is configured to communicate a haptic performance loss signal to the driver when a performance loss is determined in the at least partly autonomous drive system.

18 Claims, 2 Drawing Sheets

(56) References Cited

U.S. PATENT DOCUMENTS

| | | | |
|---|---|---|---|
| 9,007,323 B2 | 4/2015 | Araki | |
| 2002/0137570 A1* | 9/2002 | Castellon | B62D 1/16 464/138 |
| 2003/0055538 A1 | 3/2003 | Yanaka | |
| 2004/0124023 A1 | 7/2004 | Plishner | |
| 2006/0119474 A1* | 6/2006 | Requejo | B60Q 9/00 340/438 |
| 2009/0038282 A1 | 2/2009 | Avalle et al. | |
| 2009/0157247 A1* | 6/2009 | Sjogren | G08G 1/167 701/23 |
| 2009/0287367 A1 | 11/2009 | Salinger | |
| 2009/0299573 A1 | 12/2009 | Thrun et al. | |
| 2011/0032119 A1 | 2/2011 | Pfeiffer et al. | |
| 2011/0241852 A1* | 10/2011 | Braun | G05G 9/047 340/407.2 |
| 2012/0022716 A1 | 1/2012 | Kitahama et al. | |
| 2012/0083960 A1 | 4/2012 | Zhu et al. | |
| 2012/0166032 A1 | 6/2012 | Lee et al. | |
| 2012/0173069 A1 | 7/2012 | Tsimhoni et al. | |
| 2012/0271500 A1* | 10/2012 | Tsimhoni | B62D 1/28 701/23 |
| 2014/0078102 A1* | 3/2014 | Araki | G06F 3/016 345/174 |
| 2014/0118126 A1* | 5/2014 | Garg | G06F 3/016 340/407.1 |
| 2015/0006013 A1 | 1/2015 | Wimmer et al. | |
| 2015/0060185 A1 | 3/2015 | Feguri | |
| 2015/0210272 A1 | 7/2015 | Edgren | |

FOREIGN PATENT DOCUMENTS

| | | |
|---|---|---|
| DE | 19810479 A1 | 9/1999 |
| DE | 102012002304 A1 | 8/2013 |
| DE | 102012002318 A1 | 8/2013 |
| DE | 102012002581 A1 | 8/2013 |

OTHER PUBLICATIONS

Extended European Search Report dated Aug. 1, 2014, Application No. 14153277.0-1802, Applicant Volvo Car Corporation, 8 Pages.
U.S. Non-Final Office Action dated May 20, 2016, U.S. Appl. No. 14/600,055, 18 Pages.
U.S. Final Office Action dated Nov. 17, 2016, U.S. Appl. No. 14/600,055, 15 Pages.
U.S. Non-Final Office Action dated Mar. 30, 2017, U.S. Appl. No. 14/600,055, 22 Pages.
U.S. Final Office Action dated Sep. 13, 2017, U.S. Appl. No. 14/600,055, 22 Pages.
The State Intellectual Property Office of Peoples Republic of China, First Search Report for related Application No. CN201510128934.8, dated May 21, 2018, 2 pages.
The State Intellectual Property Office of Peoples Republic of China, First Office Action for related Application No. CN201510128934.8, dated Jun. 20, 2018, 13 pages (including English language translation.).
U.S. Notice of Allowance dated Jan. 12, 2018, U.S. Appl. No. 14/600,055, 6 Pages.

* cited by examiner

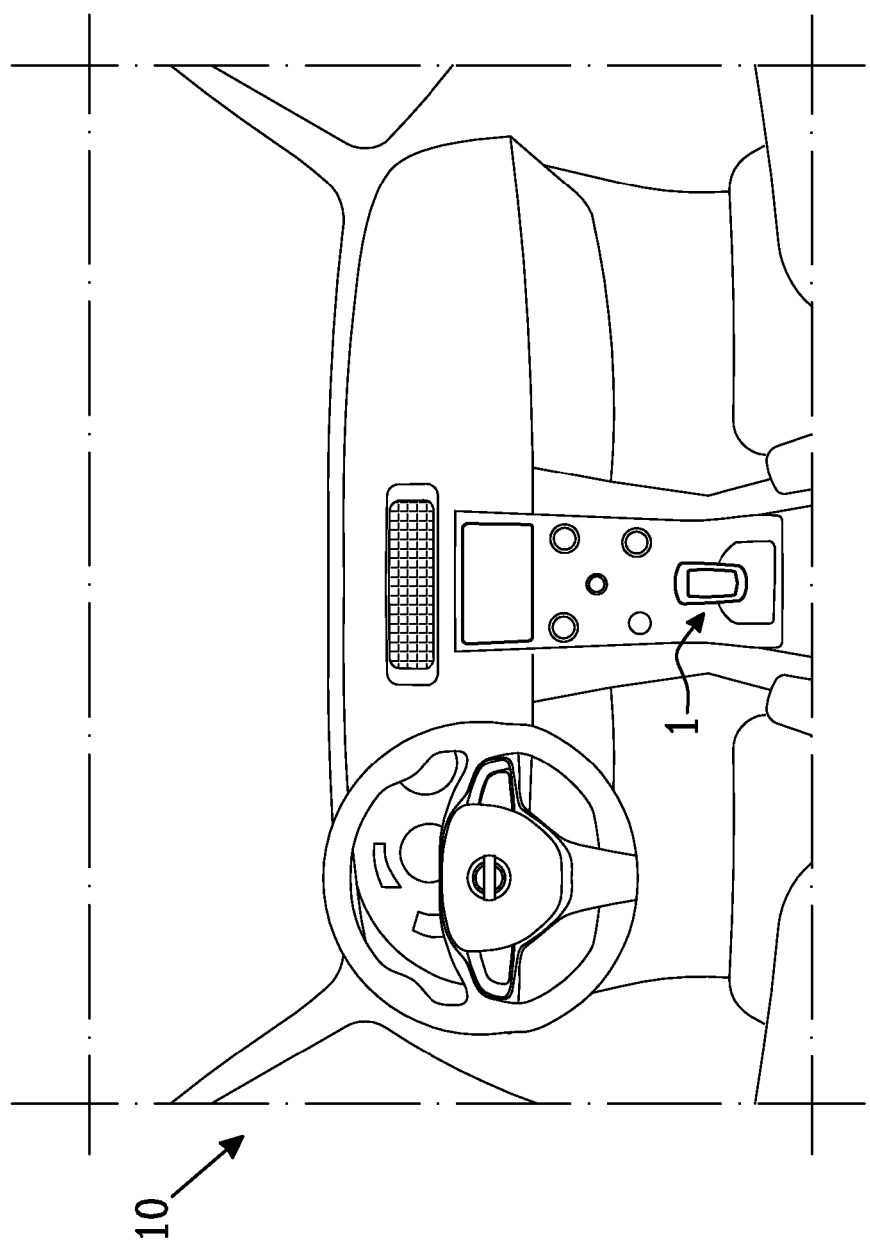

DRIVER COMMUNICATION INTERFACE IN AN AT LEAST PARTLY AUTONOMOUS DRIVE SYSTEM

CROSS-REFERENCE TO RELATED APPLICATIONS

This application claims foreign priority benefits under 35 U.S.C. § 119(a)-(d) to European patent application number EP 14166603.2, filed Apr. 30, 2014, which is incorporated by reference in its entirety.

TECHNICAL FIELD

Disclosed herein is a communication interface between a driver of a vehicle and an at least partly autonomous drive system in said vehicle. A vehicle comprising an at least partly autonomous drive system and the communication interface is also disclosed.

BACKGROUND

Modern passenger vehicles, such as cars, buses and trucks, are to an increasing degree provided with equipment and assist systems for partly or fully automating one or more driving functions of the vehicle, such as steering, lane keeping, parking, speed control, etc.

A vehicle may be provided with any degree of automation of its driving functions, ranging from a fully developed autonomous drive system or AD system to an assist system where only one or a few functions are automated. A fully developed AD system makes the vehicle capable of being safely steered and maneuvered through traffic without the need for a human driver using driving equipment such as a steering wheel or pedals while the vehicle is driven in the AD mode. Less developed automated systems may assist a driver in performing one or more actions such as steering the vehicle, parking the vehicle, keeping a safe distance to a preceding vehicle, staying within a lane, etc.

Switching between a manual driving mode and an automated/assisted driving mode is generally made through an interface arrangement between the driver and the autonomous drive system or driver assist system. The interface arrangement may comprise a manually operated communication device such as a touch screen, a button, a switch, a gear stick, a joy stick, or the steering wheel of the vehicle. The communication device may be arranged to be movable between multiple predetermined positions corresponding to pre-defined commands to be input into the autonomous drive system.

However, there may be instances when an automated function is currently unavailable due to external circumstances or circumstances inside the vehicle. Such circumstances may, for instance, be poor weather conditions, poor road conditions, technical failure or technical malfunction.

It is previously known to alert a driver of a vehicle when an assistive/autonomous function in a driver assist system is no longer available.

US20090299573 A1 is directed to an assistive steering system which operates together with driver input to steer and position a vehicle within a lane and adapting the steering of the vehicle to road curvature. It is disclosed that the driver may be required to adjust lateral offset when the vehicle localization is of insufficient quality to precisely pinpoint the vehicle within a lane, while still being sufficient to estimate the curvature of the road.

US20090299573 A1 further discloses that the driver may be aided in monitoring the accuracy of lane prediction by being shown the predicted path of the vehicle as a function of the offset on a display screen. In situations where no lane markers can be identified, and/or on roads not contained in the road database, the system may effectively disable automated steering. As a result, the vehicle direction is not affected by any automated trimming of the steerable tires, and relinquishes any effect on the steering of the vehicle to the driver. If a level of uncertainty about the curvature of the road is too great for safe road/lane-following, the vehicle may disengage the trimming feature and alert its driver, such as by an audible beep or a vibrating steering wheel.

US20120166032 A1 is a further document which is concerned with lane offset control and mentions that if a driver requests lane centering, the system determines if lane centering is available or if it is not available due to circumstances such as ECU (electronic control unit) or communication failures, errors relating to the detection sensors and actuators, or if the lane detection sensors are not able to detect lane markings on the road. If the lane centering system is available the system proceeds to carry out the driver's request.

It has been found that the existing automated systems and assist systems provide a driver with insufficient information in order to aid the driver in deciding when to use the system and when to rely on manual operation.

SUMMARY

It is an objective to provide an improved interface arrangement between a driver and an at least partly autonomous drive system. It is a further objective to offer an interface arrangement which may provide a driver of a vehicle with a better basis for choosing between using the at least partly autonomous drive system and manual operation. These and other objectives may be achieved by a communication interface between a driver of a vehicle and an at least partly autonomous drive system in the vehicle, the communication interface being configured to communicate a haptic performance loss signal to the driver when a performance loss is determined in the at least partly autonomous drive system.

By an "at least partly autonomous drive system" as used herein, is implied any autonomous drive system, semi-autonomous drive system or assisted drive system providing selectable automation of one or more driving functions.

When the interface arrangement is installed in a vehicle having an at least partly autonomous drive system, the driver may be informed of the operational status of the at least partly autonomous drive system by touching the interface arrangement and sensing a haptic signal being sent from the at least partly autonomous drive system through the interface arrangement.

In this context, information concerning the "operational status" of the at least partly autonomous drive system may include information about any internal or external conditions that may affect the driver when deciding whether to use the at least partly autonomous drive system or to perform the a driving action or driving actions in question manually. Accordingly, when a driver uses the interface arrangement to input a command to the at least partly autonomous drive system to carry out an automated function or automated functions, the driver may be alerted through the interface arrangement if the conditions for carrying out the requested function or functions are less than optimal. Based on the information obtained through the interface arrangement, the driver can make an assessment of the operational status of the at least partly autonomous drive system also in a situation where the requested function or functions are available but at an operational level which is below a pre-set optimal level and may use the assessment when deciding whether to use the at least partly autonomous drive system or not.

Likewise, when running in an automated mode, the driver may use the interface arrangement to check whether the automated drive conditions remain satisfactory or whether the operational status of the at least partly autonomous drive system has dropped to a level where the driver prefers to take over the control of the function or functions that are currently being carried out automatically.

The communication interface may be configured to communicate the haptic performance loss signal at a detected performance loss in the at least partly autonomous drive system which performance loss is less than a maximum performance loss which is acceptable for safe driving. When communicating a performance loss in an operational region where the operational status of the at least partly autonomous drive system is still within safe limits for autonomous drive, but below an optimal level for one or more driving conditions for an automated mode, the driver may choose to switch off or not to enter an autonomous drive mode and instead assume control or retain control of the function or functions subjected to performance loss. Alternatively, the driver may decide to let the vehicle continue to be driven by the at least partly autonomous drive system or to switch from a manual drive mode to the automated drive mode despite the performance loss. An indication of a performance loss may further serve to alert the driver that the operational status of the at least partly autonomous drive system is deteriorating and that manual take-over may become necessary within a near future.

A predetermined optimal level of the autonomous drive conditions is a level of operation when all sensors, actuators, and other components of the at least partly autonomous drive system are working as expected. An autonomous drive performance loss is determined in a situation in which external conditions, such as unclear road lane markers, poor antenna reception, poor visibility, poor positioning signal, and/or internal conditions, such as dirty or non-calibrated sensors, technical failure or technical malfunction affect the at least partly autonomous drive system such that the safety margin to a minimum acceptable and safe level is diminished. The ultimate consequence of a performance loss may be that all or some features of the at least partly autonomous drive system are no longer available or their operational range, such as speed, is limited. However, before reaching a degree of performance loss resulting in a loss of one or more functions of the at least partly autonomous drive system, the at least partly autonomous drive system may still be fully and safely operational albeit at a performance level below the predetermined optimal performance level.

Accordingly, the communication device may be arranged to communicate a performance loss in one or more automated functions when the conditions for using the at least partly autonomous drive system are below a predetermined optimal level. This implies that the driver of the vehicle is informed about a performance loss in the at least partly autonomous drive system in a situation where the system is still operational and not only when the at least partly autonomous drive system has determined an imminent performance loss of a degree where it is no longer safe to use the system.

The communication interface may comprise a communication device, which is arranged to be manually operated between at least two different command positions, at least one of the command positions being a resting position for an automated function of the at least partly autonomous drive system.

The communication device may include or consist of any type of switch or control which can be set in or manipulated into at least two different positions, such as an on/off switch for the autonomous drive system, a turn knob having pre-set positions, a gear-stick, a joy-stick, a touch-screen, etc.

A command position, as used herein, is any position of the communication device which corresponds to a command or instruction to the at least partly autonomous drive system to carry out a specified driving action. Accordingly, a command position may be a resting position which may be used to input a pre-defined command to make an automated driving maneuver such as a turn, a lane change, etc. A command position may also be a position along a line of movement of the communication device where movement along the line continuously shifts the communication device between continuously arranged positions along the line of movement. Command positions which are arranged in a non-stepwise, continuous manner along a line of movement of a communication device may be used to input a command to the at least partly autonomous drive system to carry out a quantifiable automated maneuver such as a speed change or a shift in position within a lane. It is to be appreciated that the line of movement may be a straight line or a curved line.

The haptic performance loss signal may be perceptible as a changed feeling of the communication device when the communication device is in the resting position for an automated function.

The changed feeling of the communication device may comprise one or more of a reduced resistance to movement around the resting position for an automated function, a vibration, a change in texture, a change in shape, and a temperature change.

By the term "vibration" as used herein is implied any vibrating or pulsating movement having a frequency and an amplitude.

It may be preferred that the changed feeling comprises a feeling of reduced resistance to movement of the communication device around the resting position for an automated function within an area of play around the resting position for an automated function.

The haptic performance loss signal as disclosed herein may comprise that the communication device is arranged to be movable within the area of play around the resting position when a performance loss has been determined in the at least partly autonomous drive system and wherein the resistance to movement of the communication device is reduced to a degree where it is less than a resistance to movement of the communication device when the at least partly autonomous drive system is in an optimal operational state but greater than a resistance to movement of the communication device when the at least partly autonomous drive system is in a non-operational state.

When the at least partly autonomous drive system is in the optimal operational state, no performance loss has been determined in the at least partly autonomous drive system and the resting position for the communication device is perceived as a distinct position, e.g., by the provision of a snap-in function. In other words, movement of the communication device into or out of the resting position requires a user of the communication device to apply a force to the communication device which is greater than a threshold force. The threshold force is set to be great enough to avoid inadvertent movement of the communication device, but to be low enough to allow comfortable maneuvering of the communication device into and out of the resting position.

When the at least partly autonomous drive system is in a non-operational state the communication device will not stick in the resting position, or will automatically move out of the resting position, implying no resistance to movement out of the resting position or even a force contribution from the at least partly autonomous drive system when moving the communication device away from the resting position. Furthermore, in the non-operational state, the resistance to moving the communication device into the resting position may be very high blocking movement of the communication device to the resting position. Alternatively, the resting position may be made unavailable by the communication device not being retained in the resting position when a non-operational state is detected in the at least partly autonomous drive system. In such case, the communication device will not "stick" after having been moved into the resting position and will preferably automatically return to a manual position.

The communication device may be arranged to be moveable to an adjacent resting position within the area of play by a moving force and to remain in the adjacent resting position in absence of the moving force. Accordingly, when a performance loss has been detected in the at least partly autonomous drive system, the communication device may come to rest in any of a multitude of positions within the area of play around the resting position. Such an arrangement provides not only a haptic signal of a performance loss communicated as a perception of the resting position being non-distinct or "fuzzy", but may also provide a visual signal of an anomaly in the position of the communication device.

The area of play around the resting position may have any suitable geometrical shape, such as oval, square, rectangular, etc., but may preferably be a circular area surrounding the resting position of the communication device. The radius of the area of play may be from 1 to 10 mm, such as from 2 to 7 mm.

As set out herein, a preferred way of signaling a haptic performance loss may be by a haptic performance loss signal comprising a reduction in perceived distinctness of the resting position for an automated function. A driver of the interface arrangement will feel the reduced distinctness as a play around the resting position.

The changed feeling of the communication device may be proportional to a degree of performance loss. By way of example, an area of play around a resting position for an automated function may be increasing with an increased performance loss, and/or the resistance to movement within an area of play around a resting position for an automated function may decrease with an increased performance loss, and/or a vibration or pulsation in the communication device may increase in frequency and/or amplitude with an increased performance loss.

Accordingly, in order to signal a performance loss, the automated drive function resting position may be arranged to be perceived as a distinct position when gripping the communication device in a case when no performance loss is determined in the at least partly autonomous drive system. When a performance loss is determined by the autonomous drive system, the communication device may be arranged to be perceived as having a play around the automated drive function resting position and be freely movable or movable with a reduced force within a limited area of play surrounding the autonomous drive resting position. The interface arrangement may be configured such that the area of play within which the communication device can be freely moved increases in correspondence to an increased performance loss and/or such that the resistance to movement within the area of play decreases with increasing performance loss.

A play around a resting position will make a driver feel that the position of the communication device is less distinct than would have been expected. This type of haptic signal may be particularly useful in situations when the conditions for using the at least partly autonomous drive system are non-ideal, but still sufficiently good for safe use. A non-distinct resting position in a mechanical control device such as a push-button, a switch, a gear-stick or a joy stick is generally associated with a lower-quality device and is, thus, an intuitive signal of imperfection. Accordingly, the indistinct position will be a warning to the driver of the communication device that the conditions for using the at least partly autonomous drive system may further deteriorate and that manual takeover of the driving of the vehicle may become necessary in a near future.

In addition to, or instead of, the position of the communication device being indistinct around the autonomous drive resting position, the communication device may be arranged to vibrate when a performance loss is detected in the at least partly autonomous drive system. A click-in sound and/or a click-in sensation when moving the communication device into a selected resting position may be used to indicate that the conditions for using the at least partly autonomous drive system are at an optimal level and that no performance loss has been determined in the system. Correspondingly, an absence of a click-in sound and/or a click-in sensation may be used to indicate that a performance loss has been determined in the at least partly autonomous drive system.

As set out herein, the communication device may consist of or comprise a joy-stick or a gear-stick. It may be preferred that the communication device is integrated in a vehicle component such as a gear-stick, thus providing an added functionality to the vehicle component.

A vehicle as disclosed herein comprises an at least partly autonomous drive system and a communication interface as disclosed herein. The communication interface is configured to be a communication interface between the at least partly autonomous drive system and a driver of the vehicle.

BRIEF DESCRIPTION OF THE DRAWINGS

The present disclosure will hereinafter be further explained by means of a non-limiting example and with reference to the appended drawings wherein:

FIG. 1 shows a communication device in a communication interface as disclosed herein;

DETAILED DESCRIPTION

Figure 3:
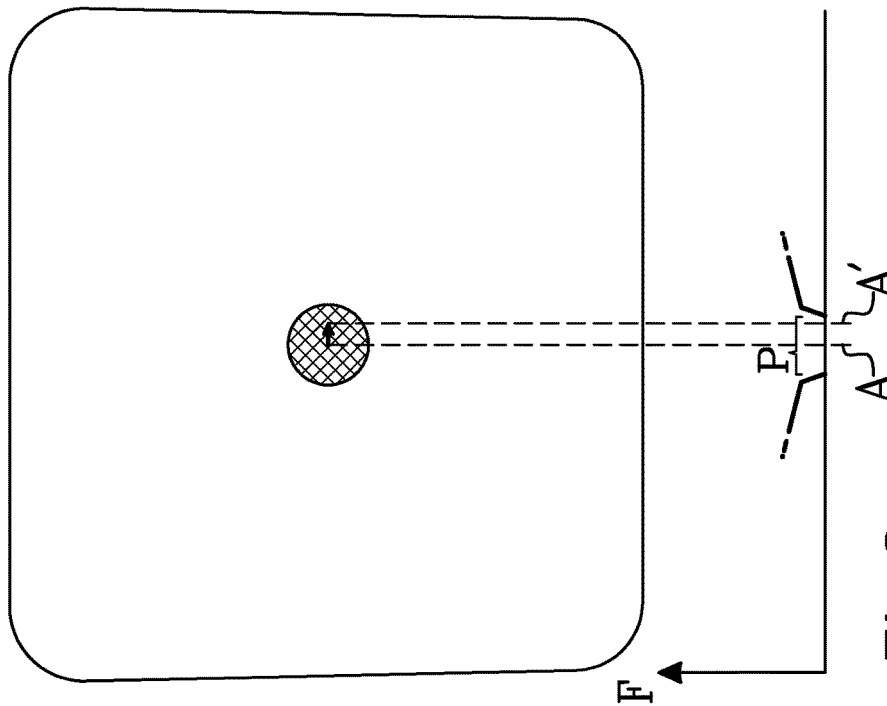
FIG. 3 shows diagrammatically a haptic signal of an automated drive function performance loss.

In the following, embodiments according to the disclosure will be described in more detail. The embodiments are provided as examples illustrating the claimed communication interface and should not be considered limiting to the disclosure. Hence, the scope of the disclosure is defined by the appended claims.

The force curves indicated in the diagrams included in the figures are schematic illustrations of suitable profiles of a resistive force experienced by a driver of a communication interface as disclosed herein when moving a communication device into and out of a rest position for an automated drive function.

In addition to haptic feedback from the interface arrangement as disclosed herein, the vehicle may be provided with any other type of equipment and arrangements for conveying driving information and/or other information to a user of the vehicle. Such additional information may be visual information in the form of text, symbols, pictures, diagrams, etc., which are shown on a display device or may be other visual indicators such as blinking lights, color coding, etc., as known in the art. Further, haptic feedback may be augmented by acoustic signals. In the case of an acoustic signal being used together with a haptic signal, the sound is preferably generated simultaneously with movement of the communication device and may provide an audible confirmation of an operational status of the at least partly autonomous drive system, such as a click which is heard when the communication device snaps into a selected position or a buzz which is heard when the communication device sends a haptic signal that a performance loss has been detected, such as a vibration or an increased play around a command position. Haptic feedback from the communication device may also be enhanced or replaced by haptic feedback e.g., from the user's seat such as a vibration in the seat which is induced when a performance loss is detected in the at least partly autonomous drive system.

Furthermore, the communication interface as disclosed herein is described with reference to a car. However, it is to be understood that the disclosure is equally applicable to any vehicle adapted for personal transportation, such as a truck, a bus, etc. The disclosure may be particularly applicable to vehicles which are intended to be driven on public roads.

With reference to FIG. 1, there is shown a communication device 1 which is arranged to be manually operated by a driver of a car 10 or other vehicle. The driver is typically seated in a driver's seat in the car 10 and the communication device 1 is placed so that it is readily accessible to the driver. The car 10 is provided with an at least partly autonomous drive system, and is equipped and configured for alternative manual control of at least one automated drive function. The communication device 1 is part of a communication interface between the at least partly autonomous drive system and the driver wanting to interact with the at least partly autonomous drive system and is configured to communicate a haptic performance loss signal to the driver when a performance loss is determined in the at least partly autonomous drive system.

Although not shown in the figure, the car 10 may be provided with additional equipment for transferring information from the at least partly autonomous drive system to a driver of the car, such as display devices and loudspeakers.

The communication device 1 is preferably ergonomically shaped such that it can be comfortably gripped and held by the driver when using the device 1. The communication device 1 is shown in FIG. 1 as a gear-stick which is designed to be movable in at least two dimensions, such as in an x-y plane. The communication device 1 may optionally be movable by pulling or pushing in the z-direction perpendicular to the x-y plane or in other directions at an angle to the x-y plane.

The disclosure should not be considered limited to the gear-stick communication device shown in FIG. 1. Accordingly, the communication device may be provided separate from the gear stick or may be integrated in another component of the car, such as in a turn signal lever, a steering wheel, etc. Furthermore, the communication device may be designed as a joystick being moveable in a curved geometry, e.g., around a ball-and-socket joint such that it can be tilted in any direction from the central resting position shown in FIG. 1, such as forward, rearward or to the sides. As set out herein, any communication device which can be set in at least one resting position for an automated drive function and in a manual drive position may be used such as a turn knob, a push button or a switch, e.g., a simple on/off switch.

As set out herein, the communication device 1 is placed in a location that is intuitive and within easy reach of the driver of the car. As shown in FIG. 1 such location may be where a gear stick is conventionally placed in the car 10. As shown in FIG. 1, the communication device 1 may be designed as conventional gear-stick and may be constructed to be used as an automatic or manual gear-stick when one or more automated drive functions of the at least partly autonomous drive system is/are deactivated and the driver controls the function or functions manually.

In the following, it is referred to a communication device 1. The communication device 1 may be the gear-stick shown in FIG. 1 or may be any other communication device as defined in the appended claims.

Figure 2:
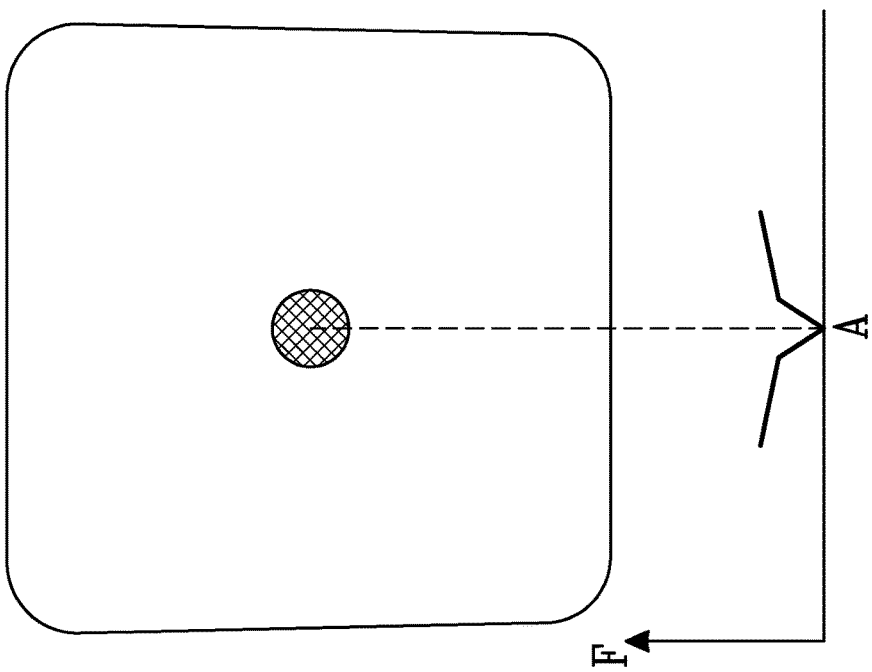
FIG. 2 shows diagrammatically a snap-in resting position for a communication device connected to an at least partly autonomous drive system.

With reference to FIG. 2, there is illustrated a control position A, which is a "resting position" corresponding to an input command or instruction to the at least partly autonomous drive system in the car 10 to carry out one or more automated functions of the at least partly autonomous drive system.

When moving the communication device 1 into the resting position A, the driver may receive a haptic signal that the at least partly autonomous drive system is available for use and is fully functioning, without any performance loss having been determined. The optimal operational state of the at least partly autonomous drive system may be signaled to the driver by the communication device 1 snapping into the position A and/or by movement of the communication device 1 out of the resting position A requiring application of a force to overcome an initial resistance to movement away from the resting position A. This situation is illustrated by the force diagram in FIG. 2.

FIG. 3 illustrates how the communication device 1 may be used to indicate to a driver a performance loss in an automated function or automated functions of the at least partly autonomous drive system.

When the conditions for using the at least partly autonomous drive system are less than 100%. i.e., less than fully satisfactory or ideal, but still good enough, i.e., satisfactory but non-ideal, for employing one or more automated drive function(s), the driver is informed about this operational status of the at least partly autonomous drive system and is pre-warned that a situation may be up-coming requiring manual takeover of the driving of the car 10. Such an indication to the driver may be performed by changing the feeling of the communication device 1 when it is in the resting position A.

When in the automated mode and under optimal operational conditions, the resting position A is perceived as a distinct position when gripping the communication device 1. As previously mentioned, the distinct resting position A may have the force profile illustrated by FIG. 2. When the driving conditions deteriorate, the feeling of the communication device 1 changes in such a way that a play is created around the resting position A resulting in the resting position being perceived as being indistinct or "fuzzy" with a reduced resistance to movement around the resting position as compared to when the driving conditions are ideal. The communication device 1 can then be freely moved or moved with less resistance within a limited area of play, P, surrounding the resting position A. Alternatively or additionally, the control can begin to rattle, vibrate or pulsate and/or may be subject to a change in temperature.

When a performance loss has been determined in the at least partly autonomous drive system, the driver will be able to move the communication device within the area of play P. The resistance to movement of the communication device 1, e.g., a frictional force, is reduced to a degree where it is less than a resistance to movement of the communication device 1 when the at least partly autonomous drive system is in an optimal operational state but greater than a resistance to movement of the communication device 1 when the at least partly autonomous drive system is in a non-operational state. This means that at a performance loss, the driver perceives the communication device 1 as being easier to move within the area of play P, than when the at least partly autonomous drive system is operational under ideal conditions.

The communication device 1 may be arranged to be moveable to an adjacent resting position A' at a distance from the main resting position A and within the area of play P. Moving the communication device 1 to the adjacent resting position A' requires application of a moving force F which is greater than zero. The communication device 1 will preferably remain in the adjacent resting position A' in absence of the moving force.

The area of play P may be a circular area surrounding the resting position A as shown in FIG. 3 and may have a radius of from 1 to 10 mm, such as from 2 to 7 mm.

Although the communication device shown in FIG. 1 is in the form of a gear stick, it is to be understood that the disclosure is equally applicable to other types of communication devices as set out herein. In a mechanical communication device in the form of a push-button or an on/off switch, a rattling "loose" feeling may be used as an indication that a performance loss has been determined in the at least partly autonomous drive system.

The performance loss signal that is conveyed to the driver may be proportional to the degree of performance loss that has been determined in the at least partly autonomous drive system. By way of example, a play around a resting position A may increase with increased performance loss and/or a vibration may increase in frequency and/or amplitude.

As set out herein a performance loss signal may be augmented by an acoustic signal and/or by visual signals. Accordingly, the communication device may change color, begin to flash, etc., when a performance loss is detected and/or a warning sound, such as a buzz may be heard.

In a communication device in the form of a touch-screen, a haptic signal may be sent as a change in surface texture, in surface hardness, in temperature, by vibrations, or by a combination of such haptic signals. As for a mechanically operated communication device, a haptic performance loss signal may be augmented by acoustic and/or visual signals.

The communication interface disclosed herein may be freely varied within the scope of the appended claim.

As one skilled in the art would understand, the at least partly autonomous drive system may include any suitable hardware and/or software for performing selectable automation of one or more driving functions and/or for determining an autonomous drive performance loss. For example, the at least partly autonomous drive system may include one or more processors having memory with software stored thereon. Likewise, the communication interface may include any suitable hardware and/or software for communicating the haptic performance loss signal. For example, the communication interface may include one or more processors having memory with software stored thereon.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A communication interface between a driver of a vehicle and an at least partly autonomous drive system in the vehicle, the communication interface comprising:
   a communication device arranged to be manually operated between at least two different command positions, at least one of the command positions being a resting position corresponding to an input command or instruction to the at least partly autonomous drive system to carry out an automated function of the at least partly autonomous drive system;
   wherein the communication interface is configured to communicate a haptic performance loss signal to the driver when a performance loss is determined in the at least partly autonomous drive system and wherein the haptic performance loss is configured to be perceived as a changed feeling of operation of the communication device when the communication device is in the resting position for an automated function.

2. The communication interface according to claim 1 wherein the communication interface is configured to communicate the haptic performance loss signal at a detected performance loss in the at least partly autonomous drive system, which performance loss is less than a maximum performance loss that is acceptable for safe driving.

3. The communication interface according to claim 1 wherein the changed feeling of the communication device comprises one or more of a reduced resistance to movement around the resting position for an automated function, a vibration, a change in texture, a change in shape, and a temperature change.

4. The communication interface according to claim 3 wherein the changed feeling of the communication device is proportional to a degree of performance loss.

5. The communication interface according to claim 1 wherein the communication device comprises a joy-stick, a gear-stick or a switch.

6. The communication interface according to claim 5 wherein the changed feeling of the communication device comprises a reduced resistance to movement of the communication device around the resting position for an automated function within an area of play around the resting position for the automated function.

7. The communication interface according to claim 6 wherein the haptic performance loss signal comprises the communication device being arranged to be movable within the area of play when a performance loss has been determined in the at least partly autonomous drive system and wherein the resistance to movement of the communication device is reduced to a degree where it is less than a resistance to movement of the communication device when the at least partly autonomous drive system is in an optimal operational state but greater than a resistance to movement of the communication device when the at least partly autonomous drive system is in a non-operational state.

8. The communication interface according to claim 7 wherein the communication device is arranged to be moveable to an adjacent resting position within the area of play by a moving force and to remain in the adjacent resting position in absence of the moving force.

9. The communication interface according to claim 6 wherein the area of play is a circular area surrounding the resting position of the communication device and wherein a radius of the area of play is from 1 to 10 mm.

10. A vehicle comprising an at least partly autonomous drive system and the communication interface according to claim 1, the communication interface being configured to be a communication interface between the at least partly autonomous drive system and a driver of the vehicle.

11. The communication interface according to claim 6 wherein the area of play is a circular area surrounding the resting position of the communication device and wherein a radius of the area of play is from 2 to 7 mm.

12. The communication interface according to claim 6 wherein the area of play around the resting position for the automated function is adapted to increase with an increased performance loss.

13. The communication interface according to claim 6 wherein resistance to movement within the area of play around the resting position for the automated function may decrease with an increased performance loss.

14. The communication interface according to claim 1 further comprising an on/off switch for the at least partly autonomous drive system.

15. A vehicle comprising an at least partly autonomous drive system and the communication interface according to claim 14, the communication interface being configured to be a communication interface between the at least partly autonomous drive system and a driver of the vehicle.

16. A communication interface between a driver of a vehicle and an at least partly autonomous drive system in the vehicle, the communication interface comprising:
  a communication device arranged to be manually operated between at least two different command positions, at least one of the command positions being a resting position for an automated function of the at least partly autonomous drive system;
  wherein the communication interface is configured to communicate a haptic performance loss signal to the driver when a performance loss is determined in the at least partly autonomous drive system, wherein the haptic performance loss signal is configured to be perceived as a changed feeling of the communication device when the communication device is in the resting position for the automated function, and wherein the changed feeling of the communication device comprises a reduced resistance to movement of the communication device around the resting position for the automated function within an area of play around the resting position for the automated function.

17. The communication interface of claim 16 wherein the communication device comprises a gear-stick.

18. The communication interface according to claim 16 wherein the area of play is a circular area surrounding the resting position of the communication device, and wherein a radius of the area of play is in the range of 1 to 10 mm.

* * * * *

UNITED STATES PATENT AND TRADEMARK OFFICE
CERTIFICATE OF CORRECTION

PATENT NO. : 10,131,186 B2
APPLICATION NO. : 14/694251
DATED : November 20, 2018
INVENTOR(S) : Edgren It is certified that error appears in the above-identified patent and that said Letters Patent is hereby corrected as shown below:

In the Claims

Column 10, Line 31, Claim 1:
After "haptic performance loss"
Insert -- signal --.

Signed and Sealed this
Ninth Day of April, 2019

Andrei Iancu
*Director of the United States Patent and Trademark Office*